United States Patent
Li et al.

(10) Patent No.: US 11,720,560 B2
(45) Date of Patent: Aug. 8, 2023

(54) SMART FILTERS AND SEARCH

(71) Applicant: Oracle International Corporation, Redwood Shores, CA (US)

(72) Inventors: Garrick Li, Lynnwood, WA (US); Hillel Noah Cooperman, Seattle, WA (US); Kathleen Maguire Candland, San Francisco, CA (US); Rozita Naghshin, San Francisco, CA (US); Rohit Kumar Singh, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 137 days.

(21) Appl. No.: 17/181,434

(22) Filed: Feb. 22, 2021

(65) Prior Publication Data

US 2022/0269678 A1    Aug. 25, 2022

(51) Int. Cl.
*G06F 16/2453*    (2019.01)
*G06F 3/04817*    (2022.01)
*G06F 16/248*    (2019.01)
*G06N 20/00*    (2019.01)

(52) U.S. Cl.
CPC .... *G06F 16/24539* (2019.01); *G06F 3/04817* (2013.01); *G06F 16/248* (2019.01); *G06N 20/00* (2019.01)

(58) Field of Classification Search
CPC ............. G06F 16/2433; G06F 16/3335; G06F 16/211; G06F 40/284; G06F 40/211
See application file for complete search history.

(56) References Cited

U.S. PATENT DOCUMENTS

| | | | | |
|---|---|---|---|---|
| 8,412,698 B1* | 4/2013 | Sarukkai | ............. | G06F 16/9535 707/706 |
| 11,120,364 B1* | 9/2021 | Gokalp | ................. | G06N 20/00 707/706 |
| 2006/0224568 A1* | 10/2006 | Debrito | ............... | G06F 16/2428 707/999.003 |
| 2012/0185498 A1* | 7/2012 | Loofbourrow | .... | G06F 16/90324 707/767 |
| 2016/0098493 A1* | 4/2016 | Primke | ................. | G06F 16/245 707/754 |
| 2019/0188296 A1* | 6/2019 | Innes | .................... | G06K 9/6256 707/706 |
| 2022/0100746 A1* | 3/2022 | Chen | .................... | G06K 9/6257 707/706 |

* cited by examiner

*Primary Examiner* — Yuk Ting Choi
(74) *Attorney, Agent, or Firm* — Invoke

(57) ABSTRACT

Techniques for suggesting a filter field based on a user input are disclosed. A system trains a machine learning model by obtaining historical data including sets of user search input, including a first search term and a first value for a first filter field. Based on the historical data, the system trains the machine learning model to associate the first filter field with the first search term. The system receives a first query for execution. The system applies the machine learning model to the first query to identify the first filter field as a suggestion. The system: recommends the first field for filtering a first set of search results corresponding to the first query. Responsive to receiving user input selecting a first value for the first filter field, the system filters using the first value to generate a set of filtered search results, and presents the filtered search results.

21 Claims, 7 Drawing Sheets

SMART FILTERS AND SEARCH

TECHNICAL FIELD

The present disclosure relates to search and filtering systems. In particular, the present disclosure relates to a machine learning model for recommending filters based on search terms.

BACKGROUND

Searching and filtering are typically the main ways to interact with a data corpus using a computer system. Searching and filtering are considered to be separate components within an experience. Generally, keyword search and faceted filtering achieve similar goals of reducing a number of information elements from within a corpus are visible to a user at a given time.

Faceted search is a technique which involves augmenting traditional search techniques with a faceted navigation system, allowing users to narrow down search results by applying multiple filters based on faceted classification. A faceted classification system classifies each information element along multiple explicit dimensions, called facets, enabling the classifications to be accessed and ordered in multiple ways rather than in a single, pre-determined, taxonomic order. Facets correspond to properties of the information elements within a corpus. Facets are often derived by analysis of the text of an item using entity extraction techniques or from pre-existing fields in a database such as author, descriptor, language, and format.

Keyword search allows a user to search a corpus for information elements that include a particular keyword or synonym thereof. A keyword is a particular word or phrase that describes the contents of an information item. A keyword can be a portion of text contained within a data item and/or metadata associated with the information item.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
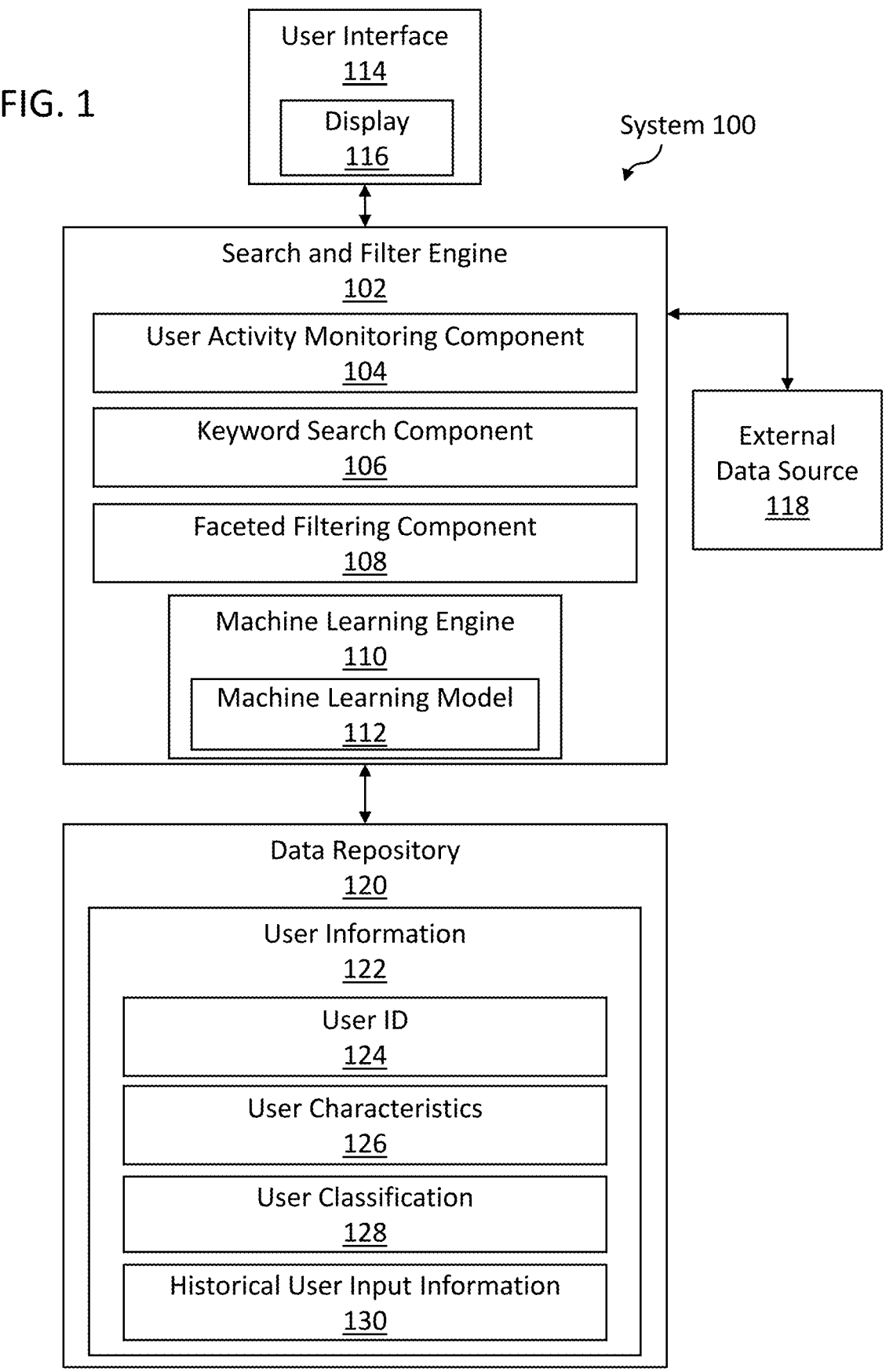
FIG. 1 illustrates a search and filter system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SEARCH AND FILTER SYSTEM
3. SUGGESTING A FILTER FIELD AND/OR FILTER FIELD VALUE BASED ON USER INPUT
4. SUGGESTING A FILTER FIELD AND/OR FILTER FIELD VALUE BASED ON USER CHARACTERISTICS
5. EXAMPLE EMBODIMENT
6. MISCELLANEOUS; EXTENSIONS
7. HARDWARE OVERVIEW

1. General Overview

One or more embodiments combine faceted filtering and keyword search within a single interface to allow for streamlined use of a searching and filtering system. The system uses machine learning to recommend at least one filter field for a user based on historical query data input and/or user characteristics. The recommended filter field may be selected from a defined candidate set of filter fields that are defined by an application or search engine, and available for user selection.

The system may recommend a filter field without a corresponding value for the filter field. The system accepts as additional input, a user-defined value for the system-recommended filter field. Alternatively or additionally, the system may recommend a filter field with a corresponding value for the filter field.

One or more embodiments train a machine learning model based on historical query data input to recommend filter fields with corresponding values or filter fields without corresponding values. Historical query data input includes combinations of search terms, filter fields, and values of filter fields used in previously executed queries. Training the machine learning model results in generating associations between (a) search terms and (b) filter fields (with or without corresponding values) based on combinations used in previously executed queries. The system may then apply the trained machine learning model to received search term(s) to generate recommended filter fields. The system may apply the trained machine learning model to search terms to generate recommended values for the recommended filter fields.

One or more embodiments train a machine learning model based on historical user data to recommend filter fields with corresponding values or filter fields without corresponding values. In an example, the machine learning model is trained with sets of training data that identify filters selected by users. The machine learning model learns to associate filters with the characteristics of the users that selected the filters. Thereafter, the machine learning model suggests filters for a user based on the characteristics of a current user. Accordingly, the machine learning model recommends filter fields that have been previously used by the current user or by other users that share characteristics with the current user.

The system may receive additional user input confirming or modifying system-selected filter fields and/or system-selected filter field values. Based on the additional user input and the initial search term, the system executes a search and filtering operation on the data corpus of information items to determine a subset of the information items to present to the user.

One or more embodiments described in this Specification and/or recited in the claims may not be included in this General Overview section.

2. Search and Filter System

FIG. 1 illustrates a system 100 in accordance with one or more embodiments. As illustrated in FIG. 1, system 100 includes a search and filter engine 102, a user interface 114, an external data source 118, a data repository 120, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, the user interface 114 refers to hardware and/or software configured to facilitate communications between a user and the search and filter engine 102. The user interface 114 may be used by a user who accesses an interface (e.g., a dashboard interface) for work and/or personal activities. The user interface 114 may be associated with one or more devices for presenting visual media, such as a display 116, including a monitor, a television, a projector, and/or the like. User interface 114 renders user interface elements and receives input via user interface elements. Examples of interfaces include a graphical user interface (GUI), a command line interface (CLI), a haptic interface, and a voice command interface. Examples of user interface elements include checkboxes, radio buttons, drop-down lists, list boxes, buttons, toggles, text fields, date and time selectors, command lines, sliders, pages, and forms.

In an embodiment, different components of the user interface 114 are specified in different languages. The behavior of user interface elements is specified in a runtime-generated programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the user interface 114 is specified in one or more other languages, such as Java, C, or C++.

In one or more embodiments, a search and filter engine 102 refers to hardware and/or software configured to perform operations described herein for performing faceted filtering and/or keyword searching operations based at least in part on input received from a user. Examples of operations for performing the faceted filtering and/or keyword searching are described below with reference to FIGS. 2 and 3.

In an embodiment, the search and filter engine 102 includes a user activity monitoring component 104. A user activity monitoring component 104 may refer to hardware and/or software configured to perform operations described herein (including such operations as may be incorporated by reference) for recognizing input from a user.

In an embodiment, the search and filter engine 102 includes keyword search component 106. The keyword search component 106 may refer to hardware and/or software configured to perform a keyword search on a corpus of data including a plurality of information elements.

In an embodiment, the search and filter component 102 includes a faceted filtering component 108. The faceted filtering component 108 may refer to hardware and/or software configured to perform faceted filtering operations on a corpus of data including a plurality of information elements.

In an embodiment, one or more components of the search and filter engine 102 use a machine learning engine 110. Machine learning includes various techniques in the field of artificial intelligence that deal with computer-implemented, user-independent processes for solving problems that have variable inputs.

In some embodiments, the machine learning engine 110 trains a machine learning model 112 to perform one or more operations. Training a machine learning model 112 uses training data to generate a function that, given one or more inputs to the machine learning model 112, computes a corresponding output. The output may correspond to a prediction based on prior machine learning. In an embodiment, the output includes a label, classification, and/or categorization assigned to the provided input(s). The machine learning model 112 corresponds to a learned model for performing the desired operation(s) (e.g., labeling, classifying, and/or categorizing inputs). The search and filter engine 102 may use multiple machine learning engines 110 and/or multiple machine learning models 112 for different purposes.

In an embodiment, the machine learning engine 110 may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. In semi-supervised learning, some inputs are associated with supervisory signals and other inputs are not associated with supervisory signals. In unsupervised learning, the training data does not include supervisory signals. Reinforcement learning uses a feedback system in which the machine learning engine 110 receives positive and/or negative reinforcement in the process of attempting to solve a particular problem (e.g., to optimize performance in a particular scenario, according to one or more predefined performance criteria). In an embodiment, the machine learning engine 110 initially uses supervised learning to train the machine learning model 112 and then uses unsupervised learning to update the machine learning model 112 on an ongoing basis.

In an embodiment, a machine learning engine 110 may use many different techniques to label, classify, and/or categorize inputs. A machine learning engine 110 may transform inputs into feature vectors that describe one or more properties ("features") of the inputs. The machine learning engine 110 may label, classify, and/or categorize the inputs based on the feature vectors. Alternatively or additionally, a machine learning engine 110 may use clustering (also referred to as cluster analysis) to identify commonalities in the inputs. The machine learning engine 110 may group (i.e., cluster) the inputs based on those commonalities. The machine learning engine 110 may use hierarchical clustering, k-means clustering, and/or another clustering method or combination thereof. In an embodiment, a machine learning engine 110 includes an artificial neural network. An artificial neural network includes multiple nodes (also referred to as artificial neurons) and edges between nodes. Edges may be associated with corresponding weights that represent the strengths of connections between nodes, which the machine learning engine 110 adjusts as machine learning proceeds. Alternatively or additionally, a machine learning engine 110 may include a support vector machine. A support vector machine represents inputs as vectors. The machine learning engine 110 may label, classify, and/or categorizes inputs based on the vectors. Alternatively or additionally, the machine learning engine 110 may use a naïve Bayes classifier to label, classify, and/or categorize inputs. Alternatively or additionally, given a particular input, a machine learning model may apply a decision tree to predict an output for the given input. Alternatively or additionally, a machine learning engine 110 may apply fuzzy logic in situations where labeling, classifying, and/or categorizing an input among a fixed set of mutually exclusive options is impossible or impractical. The aforementioned machine learning model 112 and techniques are discussed for exemplary purposes only and should not be construed as limiting one or more embodiments.

For example, the machine learning engine 110 may receive, as inputs, user characteristic information and user input including a search term. The machine learning engine 110 may associate one or more filter fields with the input search term. Alternatively or additionally, the machine learning engine 110 may associate one or more filter fields with the received user characteristic information. In embodiments, the one or more filter fields associated with the user input or user characteristic information may be selected from a defined candidate set of filter fields that are defined by an application or search engine, and available for user selection.

In embodiments, the machine learning engine 110 may receive, as inputs, historical search and/or filter information indicating search and/or filter operations executed by one or more users including a user input term, a selected filter field, and a selected value associated with the filter field. The machine learning engine 110 may process the historical information to determine one or more patterns in associating filter fields and/or filter field values with user input and/or user characteristic information.

In an embodiment, as a machine learning engine 110 applies different inputs to a machine learning model 112, the corresponding outputs are not always accurate. As an example, the machine learning engine 110 may use supervised learning to train a machine learning model 112. After training the machine learning model 112, if a subsequent input is identical to an input that was included in labeled training data and the output is identical to the supervisory signal in the training data, then output is certain to be accurate. If an input is different from inputs that were included in labeled training data, then the machine learning engine 110 may generate a corresponding output that is inaccurate or of uncertain accuracy. In addition to producing a particular output for a given input, the machine learning engine 110 may be configured to produce an indicator representing a confidence (or lack thereof) in the accuracy of the output. A confidence indicator may include a numeric score, a Boolean value, and/or any other kind of indicator that corresponds to a confidence (or lack thereof) in the accuracy of the output.

In an embodiment, the search and filter engine 102 is configured to receive data from one or more external data sources 118. An external data source 118 refers to hardware and/or software operating independent of the search and filter engine 102. For example, the hardware and/or software of the external data source 118 may be under control of a different entity (e.g., a different company or other kind of organization) than an entity that controls the search and filter engine.

In an embodiment, the search and filter engine 102 is configured to retrieve data from an external data source 118 by 'pulling' the data via an application programming interface (API) of the external data source 118, using user credentials that a user has provided for that particular external data source 118. Alternatively or additionally, an external data source 118 may be configured to 'push' data to the search and filter engine 102 via an API of the interface creation engine, using an access key, password, and/or other kind of credential that a user has supplied to the external data source 118. The search and filter engine 102 may be configured to receive data from an external data source 118 in many different ways.

In one or more embodiments, a data repository 120 is any type of storage unit and/or device (e.g., a file system, database, collection of tables, or any other storage mechanism) for storing data. Further, a data repository 120 may include multiple different storage units and/or devices. The multiple different storage units and/or devices may or may not be of the same type or located at the same physical site. Further, a data repository 120 may be implemented or may execute on the same computing system as the search and filter engine 102 and/or the external data source 118. Alternatively or additionally, a data repository 120 may be implemented or executed on a computing system separate from the search and filter engine 102 and/or the external data source 118. A data repository 120 may be communicatively coupled to the search and filter engine 102 and/or the external data source 118 via a direct connection or via a network.

User information 122 may be implemented across any of components within the system 100. However, this information is illustrated within the data repository 120 for purposes of clarity and explanation. As illustrated in FIG. 1, the user information 122 may comprise a user identifier (e.g., a used ID) 124, one or more user characteristics 126, a user classification 128, and historical query information 130 associated with the user. In embodiments, the user information 122 includes more fields, fewer fields, or different fields.

The user identifier 124 may be a character string that uniquely identifies exactly one user. The user characteristics 126 may comprise one or more characteristics of a user. As examples, the user characteristics may include features such as user age, user location, employee start date, preferred contact methods, etc. The user classification 128 may comprise one or more groups to which a user belongs. As examples, the classification may be by user seniority (e.g., new employees, senior employees, etc.), by functional group (e.g., human resources employees, marketing employees, accounting employees, etc.), and/or any other classification. The historical query information 130 may comprise a log or other data structure that includes input (e.g., a keyword) the user has previously submitted, one or more filter fields previously selected by the user, and/or one or more filter field values selected by the user. In some embodiments the historical query information 130 may store all queries submitted by a user. Alternatively, in some embodiments the historical query information 130 may be limited to a predefined number of queries (e.g., the 100 most recently submitted queries) and/or a particular time period (e.g., queries submitted in the preceding six months). In one or more embodiments, the historical query information may further comprise time information (e.g., date and time) related to when each stored query was submitted.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Suggesting a Filter Field and/or Filter Field Value Based on User Input

Figure 2:
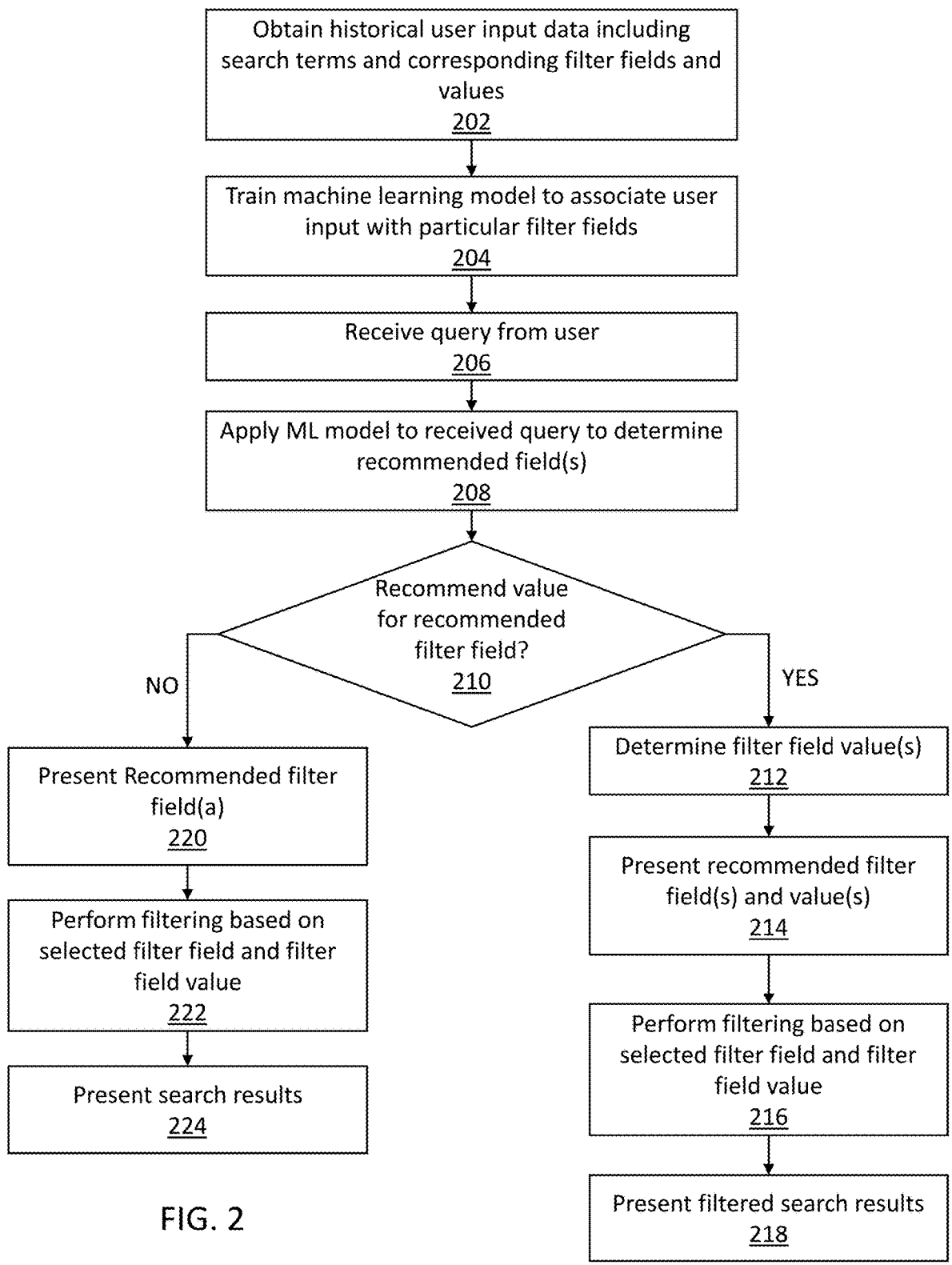
FIG. 2 illustrates an example set of operations for associating a user input with one or more filter fields in accordance with one or more embodiments.

FIG. 2 illustrates an example set of operations for associating a filer field with a user input in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

One or more embodiments obtain historical user input data and corresponding selected filter fields and values (Operation 202). The user input data may include, for example, input strings (e.g., search terms, filter fields, and/or filter field values) entered by a user. The selected filter fields may include one or more filter fields selected by the user following entry of the user input, together with a corresponding value associated with each of the filter fields. For example, in a job searching application a user may enter the input string "Chicago," and ultimately select a filter field "Location" and a value "Chicago" to apply a filter that shows only available jobs associated with the location Chicago. In embodiments, the historical data may include data from only one particular user. Alternatively, the historical data may include data from multiple users that exceed a similarity threshold with the current user (e.g., all users of a particular category, classification, or job function, all users from a particular location), or may include all users of a system. Determining that a user exceeds a similarity threshold with the current user may include determining that one or more user characteristics associated with the user substantially match one or more user characteristics associated with the current user.

The system may train one or more machine learning (ML) models to associate a user input with one or more particular filter fields and/or one or more filter field values (Operation 204). That is, given the example data above, the system may associate the user input "Chicago" with a filter field "Location" and a filter field value "Chicago." In some embodiments, the system may train a single ML model to associate a user input with one or more particular filter fields and one or more filter field values. Alternatively, the system may train a first ML model to associate the user input with one or more particular filter fields and a second ML model to associate the user input with one or more particular filter field values. In embodiments, the one or more filter fields associated with the user input are selected from a defined candidate set of filter fields that are defined by an application or search engine, and available for user selection. In embodiments, the one or more filter field values associated with the user input are selected from a defined candidate set of filter field values that are defined by an application or search engine, and available for user selection. For example, a candidate set of filter field values may be defined for each candidate filter field.

In some embodiments the ML model may be trained using historical user data to recommend filter fields with corresponding values or filter fields without corresponding values. In an example, the ML model is trained using a user's search history. The search history includes purchases of a variety of products in a blue color. The machine learning model learns to associate the color blue with the user. Thereafter, the machine learning model suggests both (a) a filter field "Color" and (b) filter value "Blue" subsequent to receiving "Shirt" as a search term.

In some embodiments, the system may train the ML model to associate a single user input with multiple filter fields and/or multiple filter field values. For example, historical user input data may indicate that a user inputs the keyword phrase "Bay Area" and selects a filter field "Location" and filter fields values of "San Francisco," "Oakland," and "San Jose." Accordingly, the system may associate the user input "Bay Area" with a filter field "Location" and filter field values "San Francisco," "Oakland," and "San Jose."

In some embodiments, the system may associate a portion of a user input with a filter field and/or a filter field value. For example, on a clothing website, a user may enter the input "Black Shirt" and may select a first filter "Color" and value "Black," and a second filter "Style" and value "Shirt." The system may associate the input "Black" with the filter field "Color" and the filter field value "Black," and associate the input "Shirt" the filter "Style" and the filter field value "Shirt."

The system may receive an input from a user (Operation 206). The input may include typed characters from a physical or virtual keyboard, voice input received via a microphone, and/or selection of inputs using another input device (e.g., selection of options using a mouse, touchscreen, etc.). In embodiments, the received input includes a search term. The search term may include one or more words entered by a user to restrict the portion of a corpus of information items viewable to a user to only information items matching the one or more words.

The system may apply the trained a trained ML model (e.g., a first ML model) to the received input to determine a set of recommended filter fields (Operation 208). Applying the trained ML model to the user input includes using the search term of the user input as an input to the trained ML model and receiving, as output, an identification of a set filter fields associated with the user input. In embodiments, the set of filter fields identified by the ML model may be selected from a defined candidate set of filter fields that are defined by an application or search engine, and available for user selection.

Optionally, the system may determine whether the set of filter fields identified by applying the trained ML model to the user input includes a non-zero number of filter fields. If the number of filter fields included in the set of filter fields identified by applying the trained ML model to the user input is zero, the system may determine that no filter fields are applicable to input. Responsive to such a determination, the system may execute a keyword search of the corpus based on the user input.

For each filter field in the set of filter fields identified by applying the trained ML model to the user input, the system may determine whether to recommend a filter field value associated with the filter field (Operation 210). In embodiments, the system may determine whether to recommend a filter field value associated with the filter field based at least in part on whether a ML model associates a filter field value with the user input. Additionally or alternatively, the ML model may associate the filter field value with one or more user characteristics of a user that provided the user input and/or one or previously selected search results of the user that provided the user input.

In response to determining that the system should recommend a filter field value for the filter field (YES in Operation 210), the system may determine a set of recommended filter field values (Operation 212). Determining a set of recommended filter field values may include determining, for the filter field, a set of one or more values that may be applied to a filter field. In embodiments, the set of recommended filter field values may be selected from among the set of one or more values that may be applied to the filter field. The set of recommended filter field values may be determined by applying a ML model to user input to determine one or more filter field values (e.g., from the set of filter field values that may be applied to the filter field) associated with the user input. Alternatively or additionally, the set of recommended filter field values may be determined by applying a ML model to user characteristics and/or previously selected search results of the user to determine one or more filter field values (e.g., from the set of filter field values that may be applied to the filter field). In some embodiments, the set of recommended filter field values may be determined based on one or more user characteristics and/or one or more information items in the corpus.

In some embodiments, determining the set of recommended filter field values may be performed in the same operation as determining the set of recommended filter fields (e.g., Operation 208). For example, a single ML model may be used to determine both the set of recommended filter fields and the set of recommended filter field values. Alternatively, the system may determine the set of recommended filter field values subsequent to determining the set of recommended filter fields, and may determine the set of recommended filter field values based at least in part on the set of recommended filter fields. The system may use a first ML model to determine the set of recommended filter fields and a second ML model to determine the set of filter field values.

The system may present the set of recommended filter fields and the associated sets of recommended filter field values to the user as candidates for approval by the user (Operation 214). In embodiments, presenting the set of recommended filter fields and the associated sets of recommended filter field values may include displaying the set of recommended filter fields and the associated sets of recommended filter field values on a monitor or other display device, creating a log file that includes the set of recommended filter fields and the associated sets of recommended filter field values, and/or transmitting a message (e.g., an email) that includes the set of recommended filter fields and the associated sets of recommended filter field values. The system can present the set of recommended filter fields and the associated sets of recommended filter field values in many different ways.

In embodiments, presenting the set of recommended filter fields and the associated sets of recommended filter field values may include associating each filter field in the set of recommended filter fields with an icon. The icon may be a graphical representation of the filter field. As particular examples, a global positioning system (GPS)-style pointer graphic may be used as an icon for a location filter, a clock graphic may be used as an icon for a duration filter. The graphic icon may be useful in conveying the filter meaning to a user, as well as in indicating that the suggestion represents a filter field.

The system may receive a selection of at least a selected filter field and a selected filter field value. Selection of a filter field may be performed by the user clicking or otherwise activating a particular filter field. Alternatively, the selection may be received by the user entering text associated with the particular filter field. The user may select more than one filter field from among the set of recommended filter fields. The user may select the particular filter field from among the presented set of recommended filter fields. Additionally or alternatively, selecting the filter field may include selecting a filter field that is not included in the set of recommended filter fields. That is, a user may enter text associated with a filter field that is not one of the filter fields recommended by the system to select such a filter field.

For each particular filter field selected, the user may select a particular filter field value. Selection of a filter field value may be performed by the user clicking or otherwise activating a particular filter field value. Alternatively, the selection may be received by the user entering text associated with the particular filter field value. The user may select more than one filter field value from among the set of recommended filter field values associated with a particular filter field. The user may select the particular filter field value from among the presented set of recommended filter field values. Additionally or alternatively, selecting the filter field value may include selecting a filter field value that is not included in the set of recommended filter field values. That is, a user may enter text associated with a filter field value that is not one of the filter field values recommended by the system to select such a field.

The system may perform a filtering operation based on the selected filter field and selected filter field value (Operation 216). Performing the filtering operation may include selecting, from the corpus of information items, a subset of information items that include the filter field and filter field value.

The system may present filtered search results (Operation 218). Presenting the filtered search results may include presenting the selected subset of information items from the corpus. In embodiments, presenting the selected subset can include displaying the selected subset on a monitor or other display device, creating a log file that includes the selected subset, and/or transmitting a message (e.g., an email) that includes selected subset. The system can present the results in many different ways.

Alternatively, in response to determining that the system should recommend a filter field value for the filter field (NO in Operation 208), the system may present the set of recommended filter fields to the user as candidates for approval by the user (Operation 220). The system may present the set of recommended filter fields without recommending a corresponding value for at least one particular filter field from among the set of recommended filter fields. In embodiments, presenting the set of recommended filter fields may include displaying the set of recommended filter fields on a monitor or other display device, creating a log file that includes the set of recommended filter fields, and/or transmitting a message (e.g., an email) that includes the set of recommended filter fields. The system can present the set of recommended filter fields in many different ways.

In embodiments, presenting the set of recommended filter fields may include associating each filter field in the set of recommended filter fields with an icon. The icon may be a graphical representation of the filter field. As particular examples, a global positioning system (GPS)-style pointer graphic may be used as an icon for a location filter, a clock graphic may be used as an icon for a duration filter. The graphical icon may be useful in conveying the filter meaning to a user, as well as in indicating that the suggestion represents a filter field.

The system may receive a selection of at least a selected filter field and a selected filter field value. Selection of a filter field may be performed by the user clicking or otherwise activating a particular filter field. Alternatively, the selection may be received by the user entering text associated with the particular filter field. The user may select more than one filter field from among the set of recommended filter fields. The user may select the particular filter field from among the presented set of recommended filter fields. Additionally or alternatively, selecting the filter field may include selecting a filter field that is not included in the set of recommended filter fields. That is, a user may enter text associated with a filter field that is not one of the filter fields recommended by the system to select such a filter field.

For each particular filter field selected, the user may select a particular filter field value. Selection of a filter field value may be performed by the user entering text associated with the particular filter field value. The user may select more than one filter field value from among the set of filter field values associated with a particular filter field.

The system may perform a filtering operation based on the selected filter field and selected filter field value (Operation 222). Performing the filtering operation may include selecting, from the corpus of information items, a subset of information items that include the filter field and filter field value.

The system may present filtered search results (Operation 224). Presenting the filtered search results may include presenting the selected subset of information items from the corpus. In embodiments, presenting the selected subset can include displaying the selected subset on a monitor or other display device, creating a log file that includes the selected subset, and/or transmitting a message (e.g., an email) that includes selected subset. The system can present the results in many different ways.

In embodiments, this process can be applied iteratively to receive multiple user inputs, filtering and/or search the corpus additionally based on each of the user inputs.

In embodiments, after a subset of the corpus has been identified (e.g., based on a filtering and/or keyword search operation), the system determines one or more candidate filter fields to suggest to a user for application to the subset of the corpus. The one or more candidate filter fields may be selected based at least in part on the subset of information items.

Figure 3:
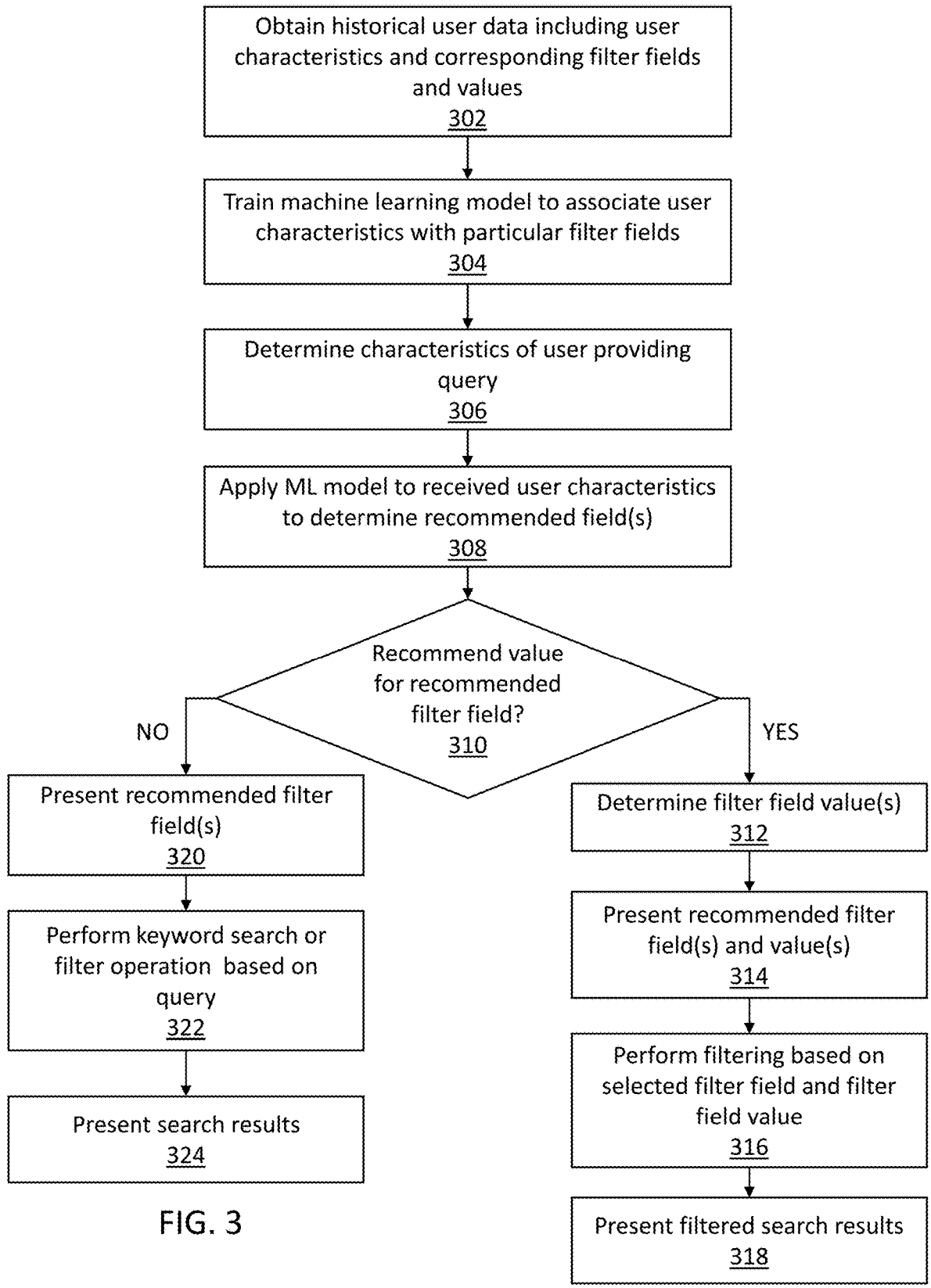
FIG. 3 illustrates an example set of operations for associating user characteristics with one or more filter fields in accordance with one or more embodiments.

4. Suggesting a Filter Field and/or Filter Field Value Based On User Characteristics FIG. 3 illustrates an example set of operations for associating a filer field with user characteristics in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

One or more embodiments obtain historical user data (Operation 302). The historical user data may include, for example, user characteristics, user input data, and selected filter fields and filter field values. In embodiments, the historical user data may include data from only one particular user. Alternatively, the historical data may include data from multiple users that exceed a similarity threshold with the current user (e.g., all users of a particular category, classification, or job function, all users from a particular location), or from all users of the system. Determining that a user exceeds a similarity threshold with the current user may include determining that one or more user characteristics associated with the user substantially match one or more user characteristics associated with the current user.

The user characteristics may include one or more characteristics of a user. As examples, the user characteristics may include features such as user age, user location, employee start date, preferred contact methods, etc. Alternatively or additionally, the user characteristics may include classification information indicating one or more groups to which a user belongs. As examples, the classification information may include user seniority information (e.g., new employees, senior employees, etc.), functional group information (e.g., human resources employees, marketing employees, accounting employees, etc.), management information (e.g., a manager assigned to a user, and/or employees managed by the user), and/or any other classification information.

The user input data may include, for example, input strings (e.g., search terms, filter fields, and/or filter field values) entered by a user. For example, a user searching a job application may enter the string "Chicago," or the string "Bay Area."

The selected filter fields and filter field values may include one or more filter fields selected by the user following entry of the user input, together with a corresponding value associated with each of the filter fields. For example, in a job searching application a user may enter the input string "Chicago," and ultimately select a filter field "Location" and a value "Chicago" to apply a filter that shows only available jobs associated with the location Chicago. In embodiments, the historical data may include data from only one particular user. Alternatively, the historical data may include data from multiple users (e.g., all users of a particular category, all users from a particular location, or all users).

The system may train a machine learning model to associate user characteristics with one or more particular filter fields and/or one or more filter field values (Operation 304). That is, given the example data above, the system may determine that a user having a location characteristic of "Chicago" is associated with a filter field "Location" and a filter field value "Chicago." In some embodiments, the system may train the machine learning model to associate user characteristics with multiple filter fields and/or multiple filter field values. In embodiments, the one or more filter fields associated with the user characteristics are selected from a defined candidate set of filter fields that are defined by an application or search engine, and available for user selection. In embodiments, the one or more filter field values associated with the user characteristics are selected from a defined candidate set of filter field values that are defined by an application or search engine, and available for user selection. For example, a candidate set of filter field values may be defined for each candidate filter field.

In some embodiments the ML model may be trained using historical user data to recommend filter fields with corresponding values or filter fields without corresponding values. In an example, the ML model is trained using a user's search history. The search history includes purchases of a variety of products in a blue color. The machine learning model learns to associate the color blue with the user. Thereafter, the machine learning model suggests both (a) a filter field "Color" and (b) filter value "Blue" subsequent to receiving "Shirt" as a search term.

The system may determine characteristics of a user providing a query to the system (Operation 306). In embodiments, the system may determine user characteristics associated with a user that is logged in to the system, prior to receiving any query from the user. Alternatively, the system may determine user characteristics associated with a user that submitted a query to the system.

The system may apply the trained a trained ML model (e.g., a first ML model) to the determine user characteristics to determine a set of recommended filter fields (Operation 308). Applying the trained ML model to the user characteristics includes using one or more of the user characteristics as an input to the trained ML model and receiving, as output, an identification of a set filter fields associated with the user characteristics. In embodiments, the set of filter fields identified by the ML model may be selected from a defined candidate set of filter fields that are defined by an application or search engine, and available for user selection.

For each filter field among the set of recommended filter fields, the system may determine whether to recommend a filter field value associated with the filter field (Operation 310). In embodiments, the system may determine whether to recommend a filter field value associated with the filter field based at least in part on whether a ML model associates a filter field value with the user characteristics. Additionally or alternatively, the ML model may associate the filter field value with user input (e.g., a query input from a user, including a search term) and/or one or previously selected search results of the user that provided the user input.

In response to determining that the system should recommend a filter field value associated with a recommended filter field (YES in Operation 310), the system may determine a set of recommended filter field values. (Operation 312). Determining the set of recommended filter field values may include applying a trained ML model to the user characteristics, using one or more of the user characteristics as an input to the trained ML model and receiving, as output, an identification of a set filter field values associated with the user characteristics. Additionally or alternatively, the set of recommended filter field values may be determined based on a user input and/or one or more previously-selected search results from the current user and/or one or more other users that meet a similarity threshold to the current user. In embodiments, the set of recommended filter field values may be selected from a defined candidate set of filter field values that are defined by an application or search engine, and available for user selection.

In some embodiments, determining the set of recommended filter field values may be performed in the same operation as determining the set of recommended filter fields (e.g., Operation 308). For example, a single ML model may be used to determine both the set of recommended filter fields and the set of recommended filter field values. Alternatively, the system may determine the set of recommended filter field values subsequent to determining the set of recommended filter fields, and may determine the set of recommended filter field values based at least in part on the set of recommended filter fields. The system may use a first ML model to determine the set of recommended filter fields and a second ML model to determine the set of filter field values.

The system may present the set of recommended filter fields and the associated sets of recommended filter field values to the user as a candidate for approval (Operation 314). In embodiments, presenting the set of recommended filter fields and the associated sets of recommended filter field values may include displaying the set of recommended filter fields and the associated sets of recommended filter field values on a monitor or other display device, creating a log file that includes the set of recommended filter fields and the associated sets of recommended filter field values, and/or transmitting a message (e.g., an email) that includes the set of recommended filter fields and the associated sets of recommended filter field values. The system can present the set of recommended filter fields and the associated sets of recommended filter field values in many different ways.

In embodiments, presenting the set of recommended filter fields and the associated sets of recommended filter field values may include associating each filter field of the set of recommended filter fields with a corresponding icon. The icon may be a graphical representation of the filter field. As particular examples, a global positioning system (GPS)-style pointer graphic may be used as an icon for a location filter, a clock graphic may be used as an icon for a duration filter. The graphic icon may be useful in conveying the filter meaning to a user, as well as in indicating that the suggestion represents a filter field.

The system may receive a selection of at least a selected filter field and a selected filter field value. Selection of a filter field may be performed by the user clicking or otherwise activating a particular filter field. Alternatively, the selection may be received by the user entering text associated with the particular filter field. The user may select more than one filter field from among the set of recommended filter fields. The user may select the particular filter field from among the presented set of recommended filter fields. Additionally or alternatively, selecting the filter field may include selecting a filter field that is not included in the set of recommended filter fields. That is, a user may enter text associated with a filter field that is not one of the filter fields recommended by the system to select such a filter field.

For each particular filter field selected, the user may select a particular filter field value. Selection of a filter field value may be performed by the user clicking or otherwise activating a particular filter field value. Alternatively, the selection may be received by the user entering text associated with the particular filter field value. The user may select more than one filter field value from among the set of recommended filter field values associated with a particular filter field. The user may select the particular filter field value from among the presented set of recommended filter field values. Additionally or alternatively, selecting the filter field value may include selecting a filter field value that is not included in the set of recommended filter field values. That is, a user may enter text associated with a filter field value that is not one of the filter field values recommended by the system to select such a field.

The system may perform a filtering operation based on a selected filter field and selected filter field value (Operation 316). The selected filter field and selected filter field value can be selected by a user interaction. Performing the filtering operation may include selecting, from the corpus of information items, a subset of information items that include the filter field and filter field value.

The system may present filtered search results (Operation 318). Presenting the filtered search results may include presenting the selected subset of information items from the corpus. In embodiments, presenting the selected subset can include displaying the selected subset on a monitor or other display device, creating a log file that includes the selected subset, and/or transmitting a message (e.g., an email) that includes selected subset. The system can present the results in many different ways.

Alternatively, in response to determining that system should not recommend a filter field value associated with a recommended filter field (NO in Operation 310), the system may present the set of recommended filter fields to the user as candidates for approval by the user (Operation 320). The system may present the set of recommended filter fields without recommending a corresponding value for at least one particular filter field from among the set of recommended filter fields. In embodiments, presenting the set of recommended filter fields may include displaying the set of recommended filter fields on a monitor or other display device, creating a log file that includes the set of recommended filter fields, and/or transmitting a message (e.g., an email) that includes the set of recommended filter fields. The system can present the set of recommended filter fields in many different ways.

In embodiments, presenting the set of recommended filter fields may include associating each filter field in the set of recommended filter fields with an icon. The icon may be a graphical representation of the filter field. As particular examples, a global positioning system (GPS)-style pointer graphic may be used as an icon for a location filter, a clock graphic may be used as an icon for a duration filter. The graphical icon may be useful in conveying the filter meaning to a user, as well as in indicating that the suggestion represents a filter field.

The system may receive a selection of at least a selected filter field and a selected filter field value. Selection of a filter field may be performed by the user clicking or otherwise activating a particular filter field. Alternatively, the selection may be received by the user entering text associated with the particular filter field. The user may select more than one filter field from among the set of recommended filter fields. The user may select the particular filter field from among the presented set of recommended filter fields. Additionally or alternatively, selecting the filter field may include selecting a filter field that is not included in the set of recommended filter fields. That is, a user may enter text associated with a filter field that is not one of the filter fields recommended by the system to select such a filter field.

For each particular filter field selected, the user may select a particular filter field value. Selection of a filter field value may be performed by the user entering text associated with the particular filter field value. The user may select more than one filter field value from among the set of filter field values associated with a particular filter field.

The system may perform a filtering operation based on the selected filter field and selected filter field value (Operation 322). Performing the filtering operation may include selecting, from the corpus of information items, a subset of information items that include the filter field and filter field value.

The system may present filtered search results (Operation 324). Presenting the filtered search results may include presenting the selected subset of information items from the corpus. In embodiments, presenting the selected subset can include displaying the selected subset on a monitor or other display device, creating a log file that includes the selected subset, and/or transmitting a message (e.g., an email) that includes selected subset. The system can present the results in many different ways.

In embodiments, this process can be applied iteratively to receive multiple user inputs, filtering and/or search the corpus additionally based on user characteristics and/or user inputs.

In embodiments, after a subset of the corpus has been identified (e.g., based on a filtering and/or keyword search operation), the system determines one or more candidate filter fields to suggest to a user for application to the subset of the corpus. The one or more candidate filter fields may be selected based at least in part on the subset of information items.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4A:
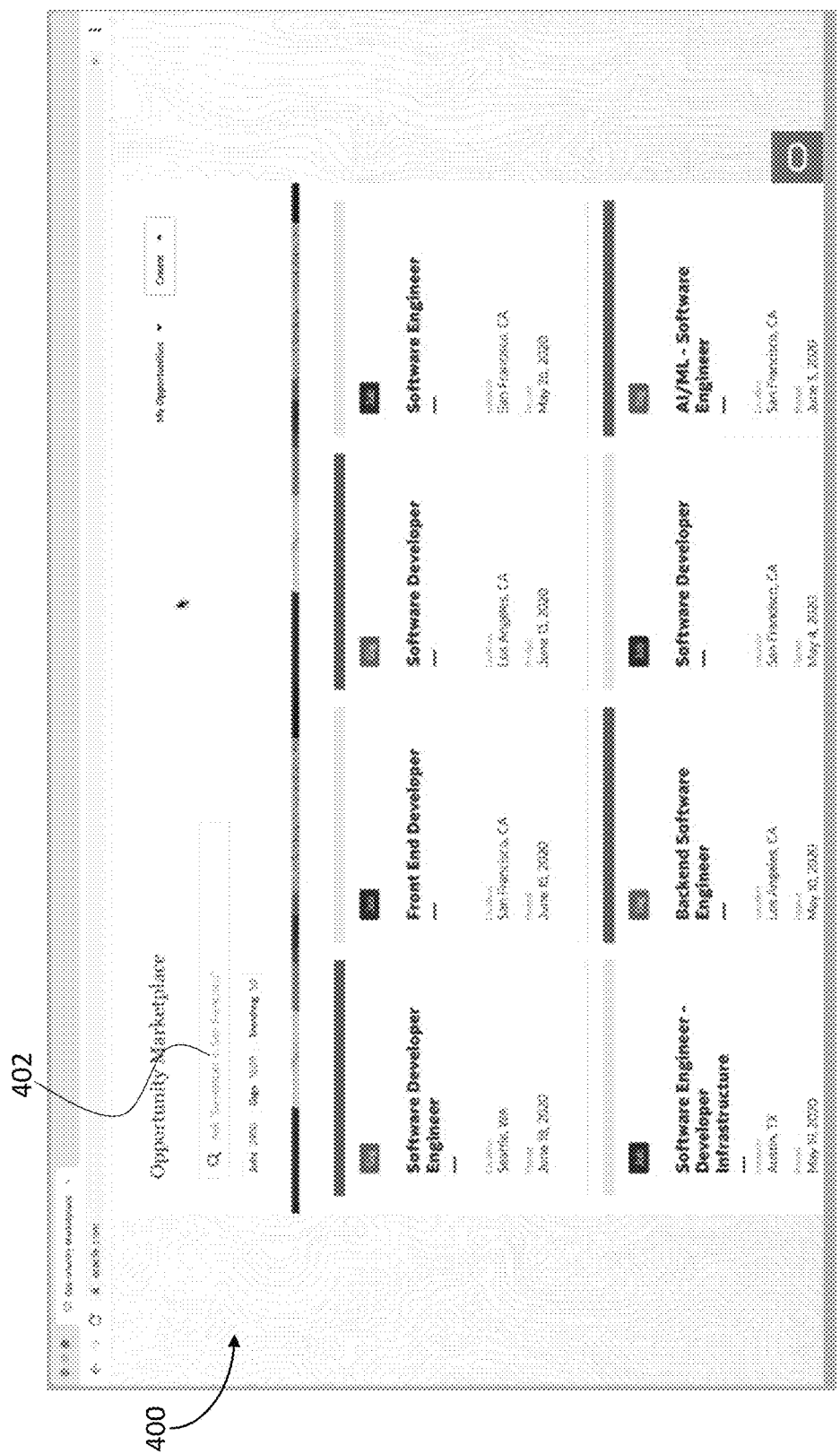
FIGS. 4A-4C show an example of associating user inputs and characteristics with a filter field in accordance with one or more embodiments.

FIG. 4A shows an example dashboard 400 for a career opportunity site including an input field 402 for a search and filter engine that performs keyword search and faceted filter operations. The dashboard 400 is configured to suggest filter fields based on user characteristics.

Figure 4B:
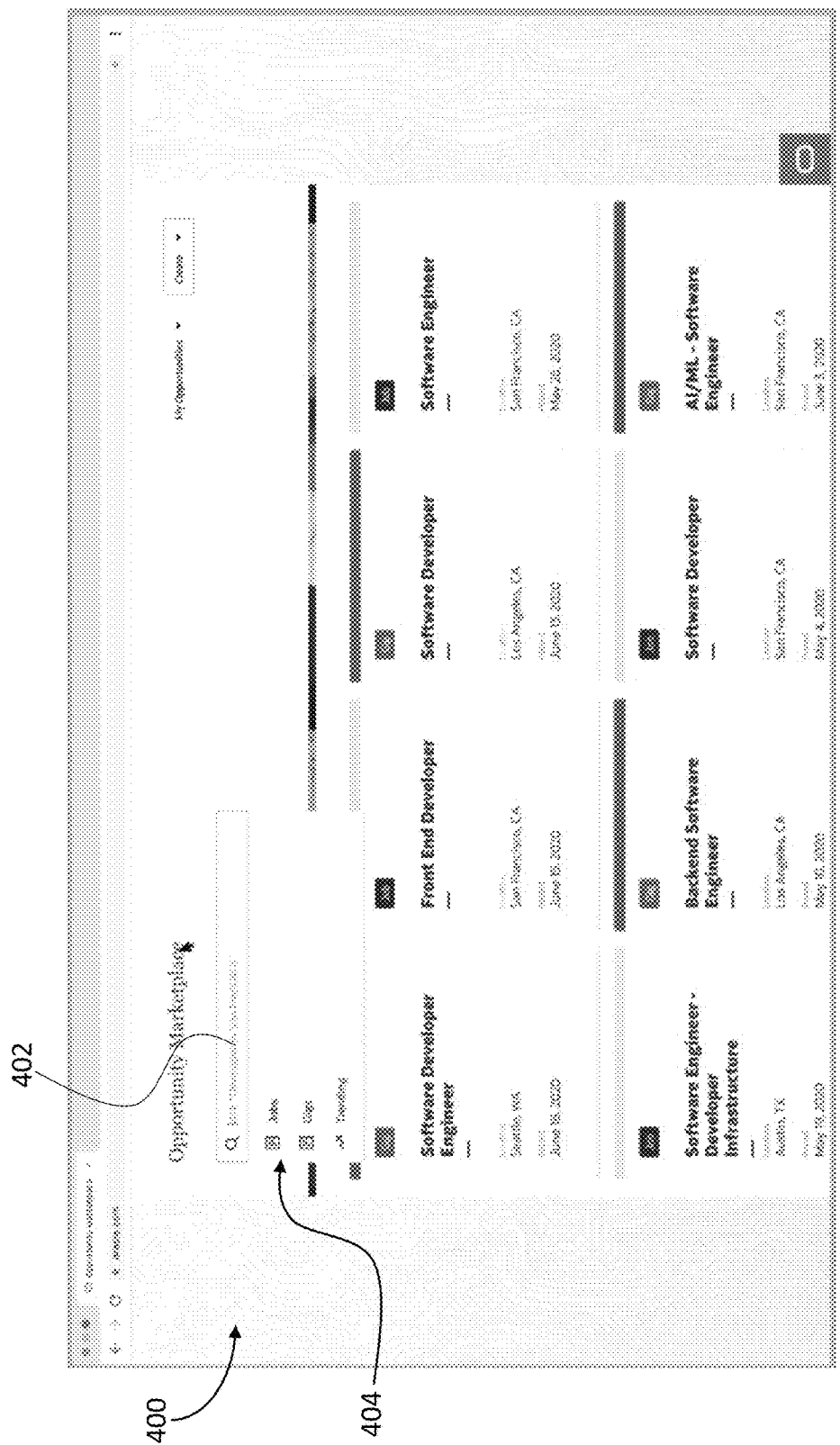

As shown in FIG. 4B, when the user interacts with the dashboard by clicking on the input field 402, the system determines, based on user characteristics, that a filter field of "Opportunity Type" should be suggested to a user. The system presents, as suggested filters 404, the "Opportunity Type" filter field and three corresponding filter field values associated with the filter field. In particular, the system suggests the filter filed value "Jobs" for permanent employees (e.g., employees that would receive a W-2), a filter field value "Gigs" for contract work, and a filter field value "Trending" for opportunities (e.g., opportunities that fall into either the category of "Jobs" or the category of "Gigs") that are popular at the present time. As shown in FIG. 4B, the system suggests the filter field and filter values prior to receiving any search or filter input from the user.

Figure 4C:

As shown in FIG. 4C, the user provides a search/filter input including the words "machine learning" in the input field 402. The system determines that the user input is not associated with any filter field. Accordingly, the system indicates performance a keyword search based on the user input, and suggests search terms 406. The performance of a keyword search is indicated by the magnifying glass graphic icon next to the search terms 406. In particular, the system suggests the input entered by the user (e.g., "machine learning") and additional search terms based on the input entered by the user.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
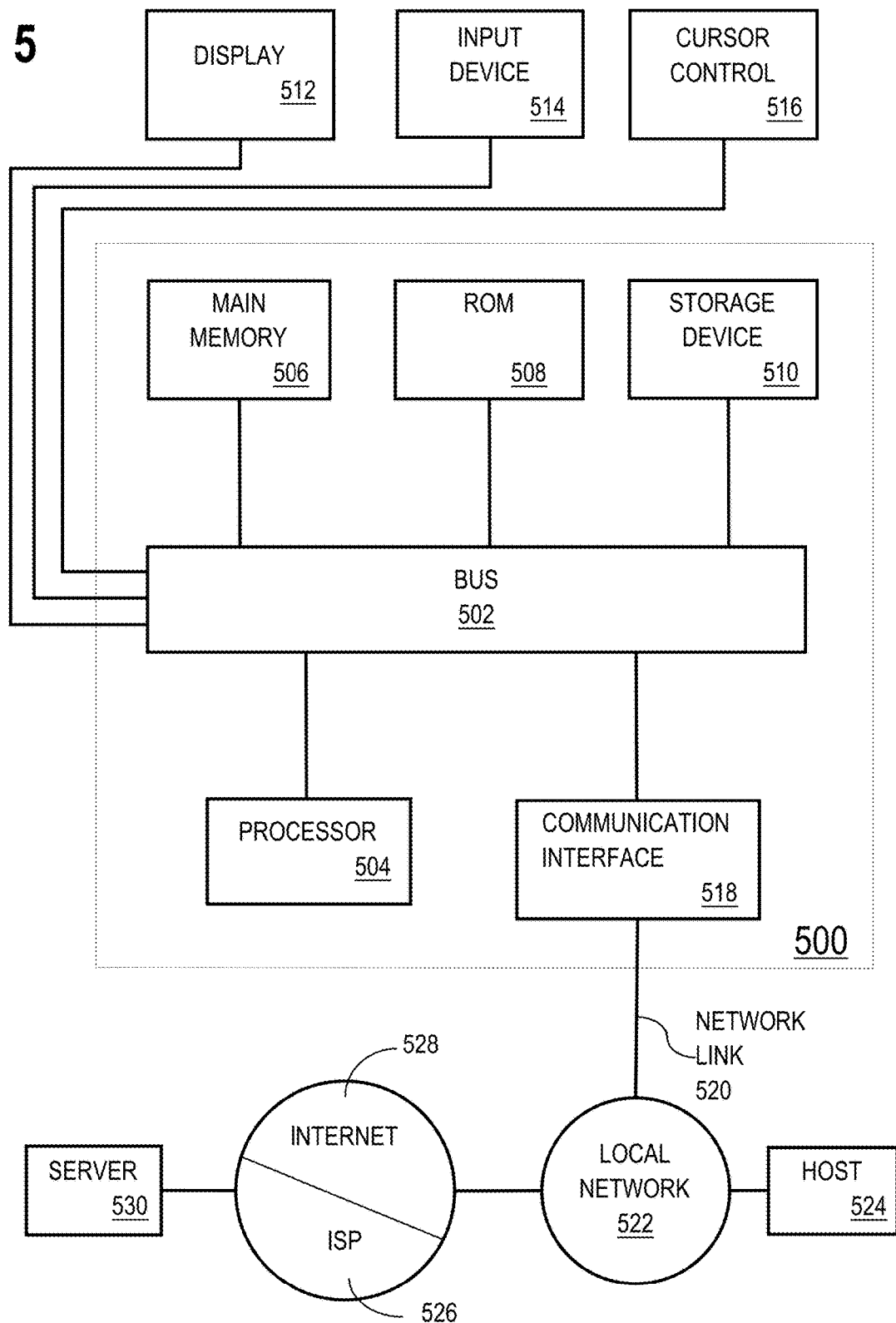
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other runtime-generated storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes runtime-generated memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its runtime-generated memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 404 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, causes performance of operations comprising:
    training a machine learning model to suggest filtering fields for executing a query at least by:
        obtaining historical data comprising sets of user input for executing searches, wherein a particular set of user input, in the sets of user input, comprises (a) a first search term and (b) a first value for a first filter field, the first filter field being selected from a plurality of filter fields comprising the first filter field and a second filter field;
        based on the historical data, training the machine learning model to associate the first filter field with the first search term without associating the second filter field with the first search term;
    receiving a first query for execution, the first query comprising the first search term;
    applying the machine learning model to the first search term in the first query, wherein the machine learning model identifies the first filter field as a suggestion without identifying the second filter field as a suggestion, wherein the machine learning model does not associate any value with the first filter field;
    based on the applying operation: recommending the first filter field for filtering a first set of search results corresponding to the first query without recommending the second filter field and without recommending any value for the first filter field;
    receiving user input selecting a first value for the first filter field;
    filtering the first set of search results corresponding to the first query based on the first value for the first filter field to generate a filtered set of search results;
    presenting the filtered set of search results.

2. The media of claim 1, wherein the operations further comprise:
    determining whether the machine learning model associates any value with the first filter field,
    wherein recommending the first filter field without recommending any value for the first filter field is performed based on determining the machine learning model does not associate any value with the first filter field,
    wherein training the machine learning model comprises training the machine learning model to associate a second value for a second filter field with a second search term,
    wherein the operations further comprise:
        receiving a second query comprising the second search term;
        applying the machine learning model to the second search term in the second query;
        based on applying the machine learning model to the second search term: recommending the second filter field for filtering a second set of search results corresponding to the second query;
        determining whether the machine learning model associates any value with the second filter field; and
        based on determining that the machine learning model associates the second value with the second filter field, recommending the second value for the second filter field for filtering the second set of search results.

3. The media of claim 2, the operations further comprising:
    receiving a second query comprising the second search term;
    applying the machine learning model to the second search term in the second query;
    based on applying the machine learning model to the second search term: recommending the second filter field for filtering a second set of search results corresponding to the second query; and
    recommending a particular value for the second filter field based on the second query.

4. The media of claim 3, the operations further comprising:
    subsequent to identifying the second filter field as a suggestion, determining the second value as a suggestion, wherein the second value is a filter field value determined at least in part based on the identified second filter field;
    wherein recommending the second filter field for filtering the second set of search results corresponding to the second query further comprises recommending the second value.

5. The media of claim 1, the operations further comprising:

subsequent to presenting the filtered set of search results:
receiving a second query for execution, the second query comprising a second search term;
recommending a second filter field for further filtering the filtered search results, the second filter field being recommended based on the first search term and the second search term;
receiving user input selecting a particular value for the second filter field;
further filtering the filtered search results based on the particular value for the second filter field to generate a twice-filtered set of search results;
presenting the twice-filtered set of search results.

6. The media of claim 1, the operations further comprising:
based on the filtered set of search results, selecting one or more candidate filter fields to be applied to the filtered set of search results.

7. The media of claim 1, the operations further comprising:
associating the first filter field with a particular icon;
wherein recommending the first filter field for filtering comprises displaying the first filter field in association with the particular icon.

8. The media of claim 1, the operations further comprising:
associating the first filter field with a particular icon, wherein recommending the first filter field for filtering comprises displaying the first filter field in association with the particular icon;
based on the filtered set of search results, selecting one or more candidate filter fields to be applied to the filtered set of search results;
subsequent to presenting the filtered search results:
receiving a second query for execution, the second query comprising a second search term;
recommending a second filter field for further filtering the filtered search results, the second filter field being recommended based on the first search term and the second search term;
receiving user input selecting a particular value for the second filter field;
further filtering the filtered search results based on the particular value for the second filter field to generate a twice-filtered set of search results;
presenting the twice-filtered set of search results.

9. One or more non-transitory machine-readable media storing instructions which, when executed by one or more processors, cause:
training a machine learning model to suggest filtering fields for executing a query at least by:
obtaining historical data comprising sets of user input for executing searches;
wherein each set of user input, in the sets of user input, defines one or more values for one or more filter fields for filtering a set of search results;
wherein the sets of user input are received from (a) a single user associated with a particular set of user characteristics or (b) a set of users associated with the same particular set of user characteristics;
based on the historical data training the machine learning model to (a) associate a first filter field, of a plurality of filter fields available for executing the searches, with searches executed by users associated with the particular set of user characteristics without (b) associating a second filter field, of the plurality of filter fields available for executing the searches, with searches executed by users associated with the particular set of user characteristics;
receiving a first query for execution, the first query being received from a first user;
determining that the first user is associated with the particular set of user characteristics;
responsive to determining that the first user is associated with the particular set of user characteristics:
applying the machine learning model to the particular set of user characteristics, wherein the machine learning model identifies the first filter field as a suggestion without identifying the second filter field as a suggestion;
based on the applying operation: recommending the first filter field for filtering a first set of search results corresponding to the first query without recommending the second filter field and without recommending any value for the first filter field, wherein the machine learning model does not associate any value with the first filter field;
receiving user input selecting a first value for the first filter field;
filtering the first set of search results corresponding to the first query based on the first value for the first filter field to generate a filtered set of search results;
presenting the filtered set of search results.

10. The media of claim 9, wherein the operations further comprise:
determining whether the machine learning model associates any value with the first filter field,
wherein recommending the first filter field without recommending any value for the first filter field is performed based on determining the machine learning model does not associate any value with the first filter field,
wherein training the machine learning model comprises training the machine learning model to associate a second value for a second filter field with a second search term,
wherein the operations further comprise:
receiving a second query comprising the second search term;
applying the machine learning model to the second search term in the second query;
based on applying the machine learning model to the second search term: recommending the second filter field for filtering a second set of search results corresponding to the second query;
determining whether the machine learning model associates any value with the second filter field; and
based on determining that the machine learning model associates the second value with the second filter field, recommending the second value for the second filter field for filtering the second set of search results.

11. The media of claim 9, wherein the first filter field is recommended based on one or more characteristics of the first user, prior to receiving the first query.

12. The media of claim 9, wherein the first filter field is recommended based on both the first query and one or more characteristics of the first user.

13. The media of claim 9, the operations further comprising:
based on the filtered set of search results, selecting one or more candidate filter fields to be applied to the filtered set of search results;

presenting the one or more candidate filter fields substantially contemporaneously with the filtered set of search results.

14. The media of claim 9, the operations further comprising:
associating the first filter field with a particular icon;
wherein recommending the first filter field for filtering comprises displaying the first filter field in association with the particular icon.

15. The media of claim 9, the operations further comprising:
receiving a second query comprising a second search term;
applying the machine learning model to the second search term in the second query;
based on applying the machine learning model to the second search term:
recommending the second filter field for filtering a second set of search results corresponding to the second query; and
recommending a candidate filter value, associated with the first filter field, based on both the first query and one or more characteristics of the first user.

16. The media of claim 15, the operations further comprising:
subsequent to identifying the second filter field as a suggestion, determining a second value as a suggestion, wherein the second value is a filter field value determined at least in part based on the identified second filter field;
wherein recommending the second filter field for filtering the second set of search results corresponding to the second query further comprises recommending the second value.

17. A method comprising:
training a machine learning model to suggest filtering fields for executing a query at least by:
obtaining historical data comprising sets of user input for executing searches, wherein a particular set of user input, in the sets of user input, comprises (a) a first search term and (b) a first value for a first filter field, the first filter field being selected from a plurality of filter fields comprising the first filter field and a second filter field;
based on the historical data, training the machine learning model to associate the first filter field with the first search term without associating the second filter field with the first search term;
receiving a first query for execution, the first query comprising the first search term;
applying the machine learning model to the first search term in the first query, wherein the machine learning model identifies the first filter field as a suggestion without identifying the second filter field as a suggestion;
based on the applying operation: recommending the first filter field for filtering a first set of search results corresponding to the first query without recommending the second filter field and without recommending any value for the first filter field, wherein the machine learning model does not associate any value with the first filter field;
receiving user input selecting a first value for the first filter field;

filtering the first set of search results corresponding to the first query based on the first value for the first filter field to generate a filtered set of search results;
presenting the filtered set of search results,
wherein the method is performed by at least one device including a hardware processor.

18. The method of claim 17, wherein the operations further comprise:
determining whether the machine learning model associates any value with the first filter field,
wherein recommending the first filter field without recommending any value for the first filter field is performed based on determining the machine learning model does not associate any value with the first filter field,
wherein training the machine learning model comprises training the machine learning model to associate
a second value for a second filter field with a second search term,
wherein the operations further comprise:
receiving a second query comprising the second search term;
applying the machine learning model to the second search term in the second query;
based on applying the machine learning model to the second search term: recommending the second filter field for filtering a second set of search results corresponding to the second query;
determining whether the machine learning model associates any value with the second filter field; and
based on determining that the machine learning model associates the second value with the second filter field, recommending the second value for the second filter field for filtering the second set of search results.

19. The method of claim 18, further comprising:
receiving a second query comprising the second search term;
applying the machine learning model to the second search term in the second query;
based on applying the machine learning model to the second search term: recommending the second filter field for filtering a second set of search results corresponding to the second query; and
recommending a particular value for the second filter field based on the second query.

20. The method of claim 18, further comprising:
subsequent to identifying the second filter field as a suggestion, determining the second value as a suggestion, wherein the second value is a filter field value determined at least in part based on the identified second filter field;
wherein recommending the second filter field for filtering the first set of search results corresponding to the second query further comprises recommending the second value.

21. The media of claim 1, wherein the operations further comprise:
prior to receiving the user input selecting the first value for the first filter field, requesting a user input for selecting one or more values.

* * * * *

UNITED STATES PATENT AND TRADEMARK OFFICE
CERTIFICATE OF CORRECTION

PATENT NO. : 11,720,560 B2
APPLICATION NO. : 17/181434
DATED : August 8, 2023
INVENTOR(S) : Li et al.

It is certified that error appears in the above-identified patent and that said Letters Patent is hereby corrected as shown below:

In the Claims

In Column 21, Line 61, in Claim 9, delete "data" and insert -- data: --, therefor.

Signed and Sealed this
Twenty-eighth Day of May, 2024

Katherine Kelly Vidal
*Director of the United States Patent and Trademark Office*